US 6,526,148 B1

(12) United States Patent
Jourjine et al.

(10) Patent No.: US 6,526,148 B1
(45) Date of Patent: Feb. 25, 2003

(54) DEVICE AND METHOD FOR DEMIXING SIGNAL MIXTURES USING FAST BLIND SOURCE SEPARATION TECHNIQUE BASED ON DELAY AND ATTENUATION COMPENSATION, AND FOR SELECTING CHANNELS FOR THE DEMIXED SIGNALS

(75) Inventors: Alexander N. Jourjine, Princeton, NJ (US); Justinian Rosca, Princeton Junction, NJ (US); Joseph Ó Ruanaidh, Lawrenceville, NJ (US); Scott Rickard, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/434,386

(22) Filed: Nov. 4, 1999

Related U.S. Application Data
(60) Provisional application No. 60/134,655, filed on May 18, 1999.

(51) Int. Cl.$^7$ .............................................. H04B 15/00
(52) U.S. Cl. ..................................................... 381/94.7
(58) Field of Search .............................. 381/94.1, 71.1, 381/94.7, 94.2; 704/200

(56) References Cited

U.S. PATENT DOCUMENTS 5,675,659 A * 10/1997 Torkkola ................. 381/71.11
5,694,474 A * 12/1997 Ngo et al. ..................... 381/66
6,023,514 A *  2/2000 Strandberg ................. 381/94.7

* cited by examiner

Primary Examiner—Forester W. Isen
Assistant Examiner—Brian Pendleton
(74) Attorney, Agent, or Firm—Donald B. Paschburg (57) ABSTRACT

A delay and attenuation compensation-based BSS technique for source selection and noise reduction is provided for speech recognition applications. The undesired signals are attenuated in every situation and from every direction as much as possible. For this purpose, the direction of the input signals is determined. Depending on the direction of the undesired signals, the internal delay between the microphones is calculated. This internal delay is then used in subtracting the microphone signals from each other. Therefore, the invention gives not only a good directionality on average, but the best directionality for every listening situation. Furthermore, the channel selection problem is solved in conjunction with the BSS technique.

24 Claims, 3 Drawing Sheets

DEVICE AND METHOD FOR DEMIXING SIGNAL MIXTURES USING FAST BLIND SOURCE SEPARATION TECHNIQUE BASED ON DELAY AND ATTENUATION COMPENSATION, AND FOR SELECTING CHANNELS FOR THE DEMIXED SIGNALS

CROSS-REFERENCE TO RELATED APPLICATIONS

This application claims the benefit of U.S. Provisional Application No. 60/134,655, filed on May 18, 1999.

BACKGROUND OF THE INVENTION

The present invention relates generally to a demixing (separation) of multiple acoustic source signals from mixtures of these signals. More particularly, the present invention relates to estimating delay and attenuation compensation parameters for Blind Source Separation (BSS) and to providing channel selection for the separated source signals.

As known to those skilled in the art, hearing devices assist people with hearing problems. A hearing device may be a hearing aid, a middle-ear implant, a cochlear-implant, or a brainstem implant, and normally includes a microphone to pick up acoustical signals, a signal processor to process the signals, and an output device. The output device may be a receiver for a hearing aid, a mechanical vibrator for a middle-ear implant, or an electrode array for cochlear implants.

In noisy environments, a typical omnidirectional microphone picks up the desired signals and the interfering noise at the same time. Depending on the signal-to-noise ratio, the signals may be masked by the noise and are hard to detect for the user of the hearing device. Several processing methods were suggested to distinguish between signals and the background noise by assuming a difference between both inputs. An assumption is, for example, that there is different frequency content (spectrum) between the signal and the noise exist and a different time structure. These processing methods, however, cannot distinguish between the desired signals and the background signals if they both contain speech, because then the frequency and time structure are similar.

One processing method that may be used in the above situations is blind source separation (BSS). Namely, BSS is a signal separation technique capable of improvements in signal to noise ratio for mixtures of independent signals, such as multiple voices or voice plus noise signals. The principles of operation of BSS are fundamentally different to those of other noise reduction approaches, such as the spectral subtraction mentioned above.

One problem, however, still hinders the devices with the conventional BSS method: it cannot be predicted on which channel each separated source will appear. The conventional BSS method uses only statistical independence between sources, and statistical independence contains no information about the scale or the order of the sources. Estimates of the sources can be recovered up to an arbitrary scale and arbitrary permutation. This effectively means that a BSS algorithm operating on blocks of data may separate sources in some order at one time, and in a different order the next time. The uncertainty about which signal is separated on a channel renders the conventional algorithm practically unusable. This problem is known in the art as the channel selection problem. To solve the channel selection problem, some other information is required to break the permutation symmetry between outputs.

A need therefore exists for a system and method that addresses the above concerns and overcomes the disadvantages of conventional BSS techniques used in hearing devices, for example.

BRIEF SUMMARY OF THE INVENTION

It is an object of the present invention to provide a fast blind source separation technique.

It is another object of the present invention to provide a solution to the channel selection problem.

It is yet another object of the present invention to separate two voices for voice mixtures even when the sources have very similar spectral power characteristics.

The above and other objects are achieved by a digital signal processing device for carrying out a blind source separation. A mixture of at least two source signals is inputted to the digital signal processing device. A number of fractionally delayed measurements of the mixture is performed, and differences between the fractionally delayed measurements are cross-correlated. The cross-correlated results are minimized to obtain demixed sources.

In accordance with one aspect of the present invention, the digital signal processing device is located in a hearing device selected from a hearing aid, a middle-ear implant, a cochlear implant, and a brainstem implant.

In accordance with another aspect of the present invention, the blind source separation is performed in time domain or frequency domain.

BRIEF DESCRIPTION OF THE DRAWINGS

The present invention is illustrated in the figures of the accompanying drawings which are meant to be exemplary and not limiting, in which like reference characters are intended to refer to like or corresponding parts, and in which.

DETAILED DESCRIPTION OF THE PREFERRED EMBODIMENTS

As a general overview, the present invention includes a system and method for providing a delay and attenuation compensation-based BSS technique for source selection and noise reduction in speech recognition applications. Furthermore, the present invention includes a system and method for solving the channel selection problem, as mentioned above, in conjunction with the inventive BSS technique.

According to the present invention, the undesired signals are attenuated in every situation and from every direction as much as possible. For this purpose, the direction of the input signals is determined. Depending on the direction of the undesired signals, the internal delay between the microphones is calculated. This internal delay is then used in subtracting the microphone signals from each other. Therefore, the invention gives not only a good directionality on average, but the best directionality for every listening situation.

The present invention advantageously improves the directionality of the hearing device depending on the direction of the input signals. Users of hearing devices can better understand the desired input signal (e.g., a speaker) in the frontal direction, while the competing input signals (e.g., other, background speakers) are attenuated. With this procedure, the signal-to-noise ratio can be increased, and speech intelligibility is improved. This technique is especially advantageous for hearing-impaired listeners who very often need an excellent signal-to-noise ratio to comprehend speech in noisy situations.

Figure 1:
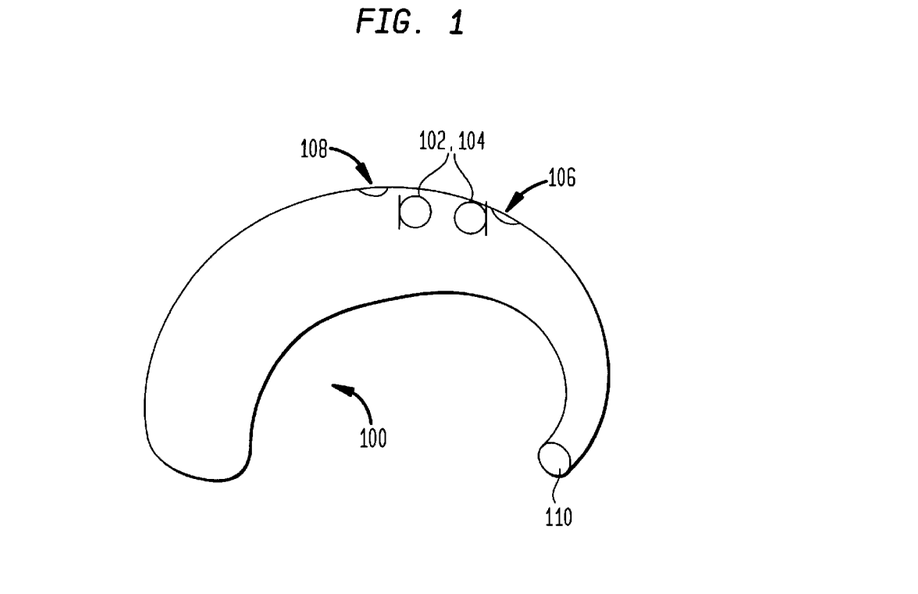
FIG. 1 illustrates a practical application of the BSS technique in accordance with the present invention.

FIG. 1 illustrates a practical application of the BSS technique in accordance with the present invention. Shown in FIG. 1 is a representative hearing device, namely behind-the-ear hearing aid 100, containing 2 microphones 102, 104 as signal acquisitions devices for acquiring sounds in audible range and converting the acquired sounds into electrical signals. As illustrated in the figure, input sounds are supplied to microphones 102, 104 through the openings 106, 108 in hearing aid 100, which expose the receiving area of the microphones to external sounds. After processing of the signals as explained in detail below, the improved sounds, illustrated as output 110 in FIG. 1, are supplied to the ear canal of the listener.

Figure 2:
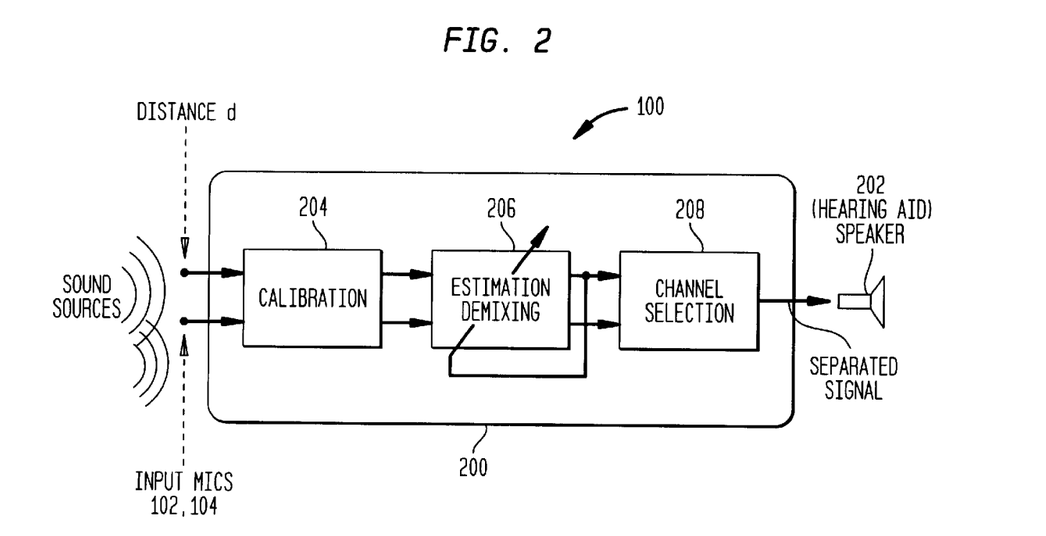
FIG. 2 shows a block diagram of hearing aid 100 as one embodiment of the present invention.

FIG. 2 shows a block diagram of hearing aid 100 as one embodiment of the present invention. Included in hearing aid 100 are at least two microphones 102, 104, signal processing device 200, which may be analog or digital such as a programmable processor, and speaker 202 for outputting audible sounds. Further shown in FIG. 2 is calibration unit 204 for calibrating or pre-processing the mixed signals to have substantially the same power levels, as explained in detail below. Estimation/Demixing unit 206 is used for de-mixing the signals in accordance with the blind source separation technique based on the delay and attenuation compensation, as also explained in detail below. Also shown in FIG. 2 is channel selection unit 208 for assigning channels to the de-mixed signals as fully described below.

The microphones are located in one or several housings near the human ear and are separated typically 10–15 mm from each other. While microphones 102, 104 are representatively housed in a behind-the-ear (BTE) hearing aid, other housings for the microphones may be used as well. These may include an in-the-ear (ITE) hearing instrument, an input device for a signal processor for cochlear implants, or a wrapping for implanted microphones.

In operation, the signals output by the two microphones in response to the received audible sounds are delayed with respect to each other. The signal delay is calculated using a method of fast blind source separation based on delay and attenuation compensation, which is described in detail below. According to this method, the directions of the incoming sound signals are estimated. One output is then selected for supplying to the user of the hearing device. The output with the best signal-to-noise ratio and therefore the best intelligibility of the desired signal is selected. One approach is to select a signal which direction is closest to the microphone axis. Another approach is to select always the frontal direction for the desired signal. The output signal with the highest level as the desired signal may also be selected. For this procedure, it might be necessary to normalize the signals or to take the high-pass characteristic of the system into account. For this purpose, the signal-to-noise ratio of the output signals has to be determined or estimated.

Next, the processing operations performed by calibration unit 204, Estimation/Demixing unit 206 and channel selection unit 208 as shown in FIG. 2 are described in detail. The description below is organized in the following manner. In section A, a theoretical foundation for the BSS technique is presented. In this section, four parameters—2 delay and 2 attenuation parameters for the case of 2 input mixtures and 2 microphones—are defined. In section B, these parameters are estimated using the demixing technique according to the present invention. The parameter estimation may take place in time domain or frequency domain. Section C describes channel selection technique according to the present invention. Finally, section D provides practical implementation of the above techniques in accordance with the present invention.

A. Conventional BSS techniques are primarily concerned with the idealistic instantaneous mixing model. However, mixtures of signals recorded in the real world are not instantaneous since the speed of propagation of any signal is always finite. Algorithms based on the instantaneous model are inherently limited, and they do not work on real-world data.

As a first approximation to the general echoic model, the delay-mixing model is used. In this model, only direct path signal components are considered; Signal components from one source arrive with a small fractional delay between the time of arrivals at two microphones. By fractional delays, it is meant that delays between microphones are not generally integer multiples of the sampling period. The delay depends on the position of the source with respect to the microphone axis and the distance between microphones. According to the present invention, the BSS technique demixes the signals by compensating for the fractional delays.

Below, two inputs and two outputs are considered for the sake of simplicity in explaining the present invention. It is understood, however, that multiple inputs and multiple outputs may be used without detracting from the scope and spirit of the present invention. Thus, a linear mixture of two sources is considered, where the source amplitude drops off in proportion to distance:

$$x_1(t) = \frac{1}{R_{11}} \cdot s_1\left(t - \frac{R_{11}}{c}\right) + \frac{1}{R_{12}} \cdot s_2\left(t - \frac{R_{12}}{c}\right) \quad (1)$$

$$x_2(t) = \frac{1}{R_{21}} \cdot s_1\left(t - \frac{R_{21}}{c}\right) + \frac{1}{R_{22}} \cdot s_2\left(t - \frac{R_{22}}{c}\right)$$

where c is the speed of sound, and $R_{ij}$ indicates the distance from microphone i to source j. This describes signal propagation through a uniform non-dispersive medium. In the Fourier (frequency) domain, the equations (1) result in the following system of equations:

$$\begin{bmatrix} x_1(\omega) \\ x_2(\omega) \end{bmatrix} = A(\omega) \begin{bmatrix} s_1(\omega) \\ s_2(\omega) \end{bmatrix}$$

where the mixing matrix $A(\omega)$ is given by:

$$A(\omega) = \begin{pmatrix} \frac{1}{R_{11}} \cdot e^{-j\omega R_{11}/c} & \frac{1}{R_{12}} \cdot e^{-j\omega R_{12}/c_2} \\ \frac{1}{R_{21}} \cdot e^{j\omega R_{21}/c_1} & \frac{1}{R_{22}} \cdot e^{j\omega R_{22}/c_2} \end{pmatrix}$$

$R_{ij}$ can be expressed in terms of the distance of source j to the midpoint between microphones, $R_j$, the direction of arrival of source j, and the distance between microphones, d, as follows:

$$R_{ij}^2 = R_j^2 + (d/2)^2 + 2(-1)^i (d/2) R_j \cos \theta_j$$

which is equivalent to:

$$R_{ij} = R_j \left( 1 + \left( \frac{d}{2R_j} \right)^2 + 2(-1)^i \left( \frac{d}{R_j} \right) \cos\theta_j \right)^{\frac{1}{2}}$$

Expanding the right term above using the binomial expansion and preserving only zero and first order terms, distance from the microphones to the sources may be expressed as:

$$R_{ij} = \left( R_j + \frac{d^2}{8 R_j} \right) + (-1)^i \cdot \frac{d}{2} \cdot \cos\theta_j \qquad (2)$$

This approximation is valid within a 5% relative error when $$d \leq \frac{R_j}{2}$$

With the substitution for $R_{ij}$ and with the redefinition of source j to include the delay due to the term within brackets in Equation (2) divided by the speed of sound c, relation (1) becomes:

$$x_i(t) = \sum_j \frac{1}{R_{ij}} \cdot s_j \left( t + (-1)^i \cdot \frac{d}{2c} \cdot \cos\theta_j \right), i = 1, 2 \qquad (3)$$

In the Fourier domain, the equations (3) result in the simplification to the mixing matrix $A(\omega)$:

$$A(\omega) = \begin{pmatrix} \frac{1}{R_{11}} \cdot e^{-j\omega\delta_1} & \frac{1}{R_{12}} \cdot e^{-j\omega\delta_2} \\ \frac{1}{R_{21}} \cdot e^{j\omega\delta_1} & \frac{1}{R_{22}} \cdot e^{j\omega\delta_2} \end{pmatrix} \qquad (4)$$

From the point of view of source separation, the scaling of each column in the mixing matrix is arbitrary since any such scaling can be absorbed into the source definition. Therefore, the mixing matrix can be expressed in the following form:

$$A(\omega) = \begin{pmatrix} \frac{1}{R_{11}} & \frac{1}{R_{12}} \\ \frac{1}{R_{21}} \cdot e^{j\omega 2\delta_1} & \frac{1}{R_{22}} \cdot e^{j\omega 2\delta_2} \end{pmatrix}$$

This form of the mixing matrix is easier to extend to more than two sources. For the 4 microphones configured in the form of a uniform linear array recording a mixture of four distant sources, the mixing matrix is as follows:

$$A(\omega) = \begin{bmatrix} \frac{1}{R_{11}} & \frac{1}{R_{12}} & \frac{1}{R_{13}} & \frac{1}{R_{14}} \\ \frac{1}{R_{21}} e^{j\omega\delta_1} & \frac{1}{R_{22}} e^{j\omega\delta_2} & \frac{1}{R_{23}} e^{j\omega\delta_3} & \frac{1}{R_{24}} e^{j\omega\delta_4} \\ \frac{1}{R_{31}} e^{j\omega 2\delta_1} & \frac{1}{R_{32}} e^{j\omega 2\delta_2} & \frac{1}{R_{33}} e^{j\omega 2\delta_3} & \frac{1}{R_{34}} e^{j\omega 2\delta_4} \\ \frac{1}{R_{41}} e^{j\omega 3\delta_1} & \frac{1}{R_{42}} e^{j\omega 3\delta_2} & \frac{1}{R_{43}} e^{j\omega 3\delta_3} & \frac{1}{R_{44}} e^{j\omega 3\delta_4} \end{bmatrix}$$

For the two microphone case, phases are functions of the directions of arrival $\theta$ (defined with respect to the midpoint between microphones), the distance between microphones d, and the speed of sound c:

$$\delta_1 = \frac{d}{2c} \cdot \cos\theta_1 \qquad \delta_2 = \frac{d}{2c} \cdot \cos\theta_2. \qquad (5)$$

$R_{ij}$ are unknown, sources can again be redefined so that the diagonal elements are unity:

$$A(\omega) = \begin{pmatrix} e^{-j\omega\delta_1} & c_1 \cdot e^{-j\omega\delta_2} \\ c_2 \cdot e^{-j\omega\delta_1} & e^{-j\omega\delta_2} \end{pmatrix} \qquad (6)$$

where $c_1$, $c_2$ are two positive real numbers. Equation (6) describes the mixing matrix for the delay model in the frequency domain, in terms of four parameters, $\delta_1, \delta_2, c_1, c_2$. These are delay and attenuation parameters which are estimated/determined in section B herein.

The corresponding ideal demixing matrix $W(\omega)$, for each frequency $\omega$, is given by:

$$W(\omega) = A(\omega)^{-1} = \frac{1}{\det A(\omega)} \cdot \begin{pmatrix} e^{j\omega\delta_2} & -c_1 \cdot e^{-j\omega\delta_2} \\ -c_2 \cdot e^{j\omega\delta_1} & e^{-j\omega\delta_1} \end{pmatrix} \qquad (7)$$

The outputs, estimating the sources, are:

$$\begin{pmatrix} z_1(\omega) \\ z_2(\omega) \end{pmatrix} = W(\omega) \cdot \begin{pmatrix} x_1(\omega) \\ x_2(\omega) \end{pmatrix} = \qquad (8)$$

$$\frac{1}{e^{j\omega(\delta_1 - \delta_2)} - c_1 c_2 e^{-j\omega(\delta_2 - \delta_1)}} \cdot \begin{pmatrix} e^{j\omega\delta_2} & -c_1 \cdot e^{-j\omega\delta_2} \\ -c_2 \cdot e^{j\omega\delta_1} & e^{-j\omega\delta_1} \end{pmatrix} \cdot \begin{pmatrix} x_1(\omega) \\ x_2(\omega) \end{pmatrix}$$

Making the transition back to the time domain, the following estimate of the outputs is obtained:

$$\begin{pmatrix} z_1(t) \\ z_2(t) \end{pmatrix} = h(t, \delta_1, \delta_2, c_1, c_2) \otimes \begin{pmatrix} x_1(t + \delta_2) - c_1 x_2(t - \delta_2) \\ c_2 x_1(t + \delta_1) - x_2(t - \delta_1) \end{pmatrix} \qquad (9)$$

where $\otimes$ is convolution, and $$h(t, \delta_1, \delta_2, c_1, c_2) = \frac{1}{2\pi} \int H(\omega, \delta_1, \delta_2, c_1, c_2) e^{i\omega t} d\omega, \qquad (10)$$

$$H(\omega, \delta_1, \delta_2, c_1, c_2) = \frac{1}{e^{j\omega(\delta_1 - \delta_2)} - c_1 c_2 e^{-j\omega(\delta_2 - \delta_1)}}$$

Note that, without the filter term h:

$$\begin{pmatrix} z_1(t) \\ z_2(t) \end{pmatrix} \propto \begin{pmatrix} x_1(t+\delta_2) - c_1 x_2(t-\delta_2) \\ c_2 x_1(t+\delta_1) - x_2(t-\delta_1) \end{pmatrix} \propto \begin{pmatrix} x_1(t+2\delta_2) - c_1 x_2(t) \\ c_2 x_1(t+2\delta_1) - x_2(t) \end{pmatrix} = \begin{pmatrix} x_1(t+D_2) - c_1 x_2(t) \\ c_2 x_1(t+D_1) - x_2(t) \end{pmatrix}$$ (11)

$$D_1 = 2\delta_1, D_2 = 2\delta_2$$

Formulae (8), (9) and (11) are the basis for the two algorithms to be described next, in the time and frequency domains. The algorithms have the role of determining the four unknown parameters. Note that the filter corresponding to $[1/\det A(\omega)]$ should be applied to the output estimates in order to map back to the original inputs.

It is noted that the demixture for the first source depends on the second delay, and the demixture for the second source depends on the first delay. In array processing terms, source 1 is separated from the mixture by placing a directional notch in the direction of source 2 which requires knowledge of the fractional delay for source 2. This behavior generalizes to the case of more than two microphones. The inverse of any invertible matrix is the transpose of the cofactor matrix (i.e. the adjoint) divided by the determinant. From the definition of the mixing matrix given above, the j-th column of the cofactor matrix is a function of all other columns and is not dependent on $\delta_j$, the delay for the j-th source. Rather it is dependent on $\delta_i : i \neq j$, $1 \leq i \leq N$ where N is the number of sources and number of microphones. Therefore, $\delta_j$ may be associated with the j-th source in an unambiguous way because of its absence in j-th row of the demixing matrix.

B. The method described herein uses only second order statistics but higher order statistical methods can be used, if desired. The exact method used to determine the delay parameters is irrelevant to the channel selection scheme so the demixing technique described below is only given here as an example. The described channel selection scheme depends only on the formulation of the mixing matrix and not on the specific BSS technique.

The estimation of the four unknown parameters $\delta_1$, $\delta_2$, $c_1$, $c_2$ can be carried out based on second order criteria that impose the constraint that outputs are decorrelated.

In the time domain, the decorrelation constraint is:

$$\langle z_1(t), z_2(t) \rangle = 0$$ (12)

The time domain algorithm is based on the idea of imposing this decorrelation constraint between the estimates of the outputs, as a function of the delays $D_1$ and $D_2$ and scalar coefficients $c_1$ and $c_2$. This is equivalent to the following criterion:

$$\{\hat{D}_1, \hat{D}_2, \hat{c}_2, \hat{c}\} = \arg\min\{F(D_1, D_2, c_1, c_2)\}$$ (13)

where F measures the cross-correlations between the signals given below, representing filtered versions of the differences of fractionally delayed measurements which generalizes equation (12):

$$F(D_1, D_2, c_1, c_2) = \langle h(t, D_1, D_2, c_1, c_2) \otimes (x_1(t+D_2) - c_1 x_2(t)), h(t, D_1, D_2, c_1, c_2) \otimes (c_2 x_1(t+D_1) - x_2(t)) \rangle$$ (14)

The differences of fractionally delayed measurements (the rightmost parts of the convolutions above) are filtered with a filter implementing the following frequency domain definition:

$$H(\omega, \delta_1, \delta_2, c_1, c_2) = \frac{1}{e^{j\omega(\delta_1-\delta_2)} - c_1 c_2 e^{-j\omega(\delta_2-\delta_1)}}$$ (15)

In the frequency domain, the cross-correlation constraint is stated as follows:

$$R^X(\omega) = A(\omega) R^S(\omega) A^H(\omega)$$

The mixing matrix in the frequency domain has the form given in Equation (4) above. Inverting this cross correlation constraint yields four equations that are written in matrix form as:

$$R^S(\omega) = A^{-1}(\omega) R^X(\omega) A^{-H}(\omega)$$ (16)

Source orthogonality implies that the off-diagonal terms in the covariance matrix must be zero:

$$R_{12}^S(\omega) = 0$$

$$R_{21}^S(\omega) = 0$$

For far field conditions (i.e. the distance between the microphones is much less than the distance from sources) and when the power inputs at the two microphones are well matched $c_1 = c_2 = 1$ and one, the following equations are obtained:

$$R_{12}^S(\omega) = \frac{a}{b} R_{11}^X(\omega) + \frac{b}{a} R_{22}^X(\omega) - ab R_{21}^X(\omega) - \frac{1}{ab} R_{12}^X(\omega) = 0$$

$$R_{21}^S(\omega) = \frac{b}{a} R_{11}^X(\omega) + \frac{a}{b} R_{22}^X(\omega) - ab R_{21}^X(\omega) - \frac{1}{ab} R_{12}^X(\omega) = 0$$

$$a = e^{-j\omega\delta_1}$$

$$b = e^{-j\omega\delta_2}$$

When $c_1$ and $c_2$ are different from 1 then we find $$R_{12}^S(\omega) =$$

$$\overline{c}_1 \frac{a}{b} R_{11}^X(\omega) + c_2 \frac{b}{a} R_{22}^X(\omega) - c_2 \overline{c}_1 ab R_{21}^X(\omega) - \frac{1}{ab} R_{12}^X(\omega) = 0$$

$$R_{21}^S(\omega) = c_1 \frac{b}{a} R_{11}^X(\omega) + \overline{c}_2 \frac{a}{b} R_{22}^X(\omega) - ab R_{21}^X(\omega) - \frac{c_1 \overline{c}_2}{ab} R_{12}^X(\omega) = 0$$

$$a = e^{-j\omega\delta_1}$$

$$b = e^{-j\omega\delta_2}$$

The terms a and b are functions of the time delays. Note that there is a pair of equations of this kind for each frequency. Even when $c_1 = c_2$ the two equations are independent if $R_{11}^X(\omega)$ is not equal to $R_{22}^X(\omega)$ so, in theory the delays and the scalar coefficients can be determined. In practice, the unknowns should be estimated from data at various frequencies. After taking into account all terms from Equation (16), including the determinant of the mixing matrix A, the function to be used for parameter estimation, in its most general form, is obtained in a manner similar to Equation (14):

$$F(\delta_1, \delta_2, c_1, c_2) =$$ (17)

$$\sum_\omega \frac{1}{|\det A|^2} \cdot \left( \left| \frac{a}{b} R_{11}^X(\omega) + \frac{b}{a} R_{22}^X(\omega) - ab R_{21}^X(\omega) - \frac{1}{ab} R_{12}^X(\omega) \right|^q + \right.$$

-continued $$\left| \frac{a}{b} R_{11}^X(\omega) + \frac{b}{a} R_{22}^X(\omega) - \frac{1}{ab} R_{21}^X(\omega) - ab R_{12}^X(\omega) \right|^q \right)$$

where q defines the norm used. The cost function may be constructed on the basis of a minimum sum of absolute errors (q=1) or a minimum sum of squared errors (q=2). Equation (15) for the time domain also involves a choice of suitable norm. Because of the impulsive nature of the estimation errors in the correlation functions, the cost function is more robust if a low value of norm (i.e. q=1) is used. The special case, q=2 is interesting because it corresponds to the sum of the squares of the correlation constraints in the frequency domain which, by the Parseval relation, are identical to the sum of the squares in the time domain.

C. Up to this point, there was no guarantee that estimated parameters would ensure source separation in some specific order. It could not be decided a priori whether estimated parameters for the first output channel correspond to the first or second source. However, the dependence of the phase delays on the angles of arrival in Equation (5) suggests a way to break the symmetry in source estimation, that is, to decide which estimate to present on the first channel (and henceforth on the second channel as well).

The core idea is that directionality provides the needed cue to break the symmetry. The criterion used is to always present on the first channel the source which is closest to the microphone axis. Closeness corresponds to the angle of arrival, with the zero degree axis aligned with the microphone axis and pointing forward. This translates into determining the minimum delay parameter, and assigning it to the first channel. Henceforth, [the so-called channel selection property] the present delay and attenuation based BSS algorithms can present on the first channel the source that is closest to the microphone axis by determining the corresponding extremal value of the delay parameter and assigning it to the first channel.

Next this property of the algorithms is proved. Indeed, given the maximum delay between recordings of the same signals at the two microphones $$\tau_{max} = \frac{d}{c} \quad (18)$$

delay parameters δ (and D respectively) are bounded by:

$$\delta \in \left[ -\frac{\tau_{max}}{2}, \frac{\tau_{max}}{2} \right] \quad (19)$$
$$D \in [-\tau_{max}, \tau_{max}]$$

where the minimum value corresponds to a 180-degree source position (rear) and the maximum value corresponds to a zero degree (front).

Let it be assumed that the source with the biggest phase delay, δ1, is s1 and the corresponding scaling parameter is c1. Similarly, let it be assumed that the source with the smallest phase delay, δ2, is s2 and the corresponding scaling parameter is c2.

These parameters result in spatial filtering of the two sources. The estimate for s1 is obtained by spatially filtering out s2 using parameters δ2 and c2, while the estimate for s2 is obtained by spatially filtering out s1 using parameters δ1 and c1.

The correspondence between delays and sources is unique when sources are not symmetrical with respect to the microphone axis. When sources are symmetrical, there is no way of distinguishing between their positions because the cosine of the angles of arrival, and hence the delay, is invariant to the sign of the angle. When the sources are not symmetrical about the microphone axis, an ordering of the channels may be imposed using spatial cues, which are used in the BSS technique.

D. The goal of a separation algorithm is to use a criterion such as (14) in order to estimate the unknown parameters. This is carried out by implementing Equation (13) or (17). Once parameters are estimated, they can be used to compute the decorrelated outputs.

Two algorithms derived from each of these criteria may be used:

Minimization of cross-correlation constraint in the frequency domain

Minimization of cross-correlation of channel differences in the time domain

Each method is described in detail below. The flowcharts, common to the two algorithms, are presented, and then the main components within each block are described in detail. These components are fractional delay, data preprocessing, estimation, demixing, and postprocessing.

Figure 3:
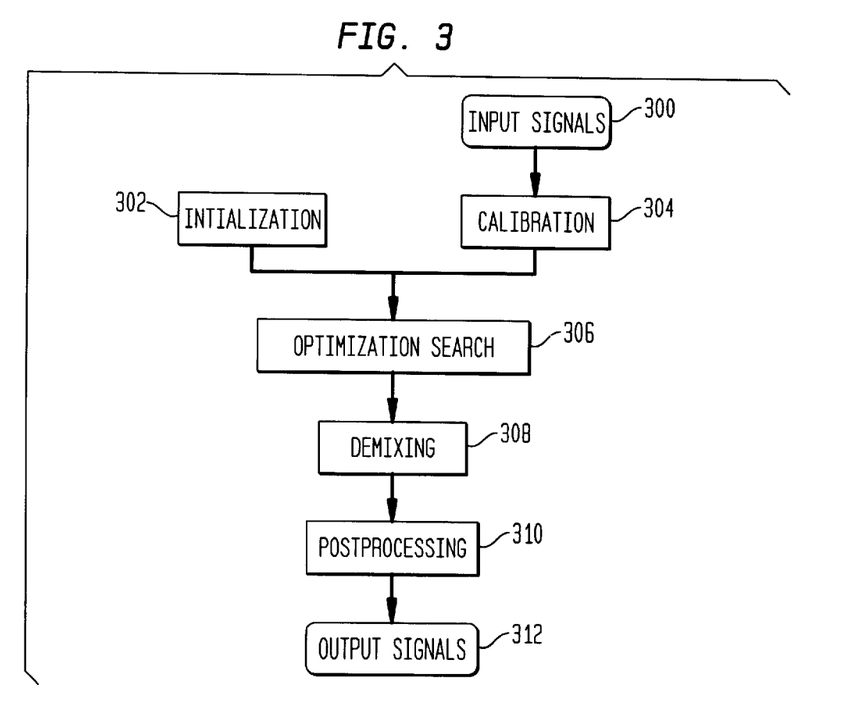
FIG. 3 is a process flowchart for implementing the time and frequency domain algorithms in accordance with the present invention.
Figure 4:
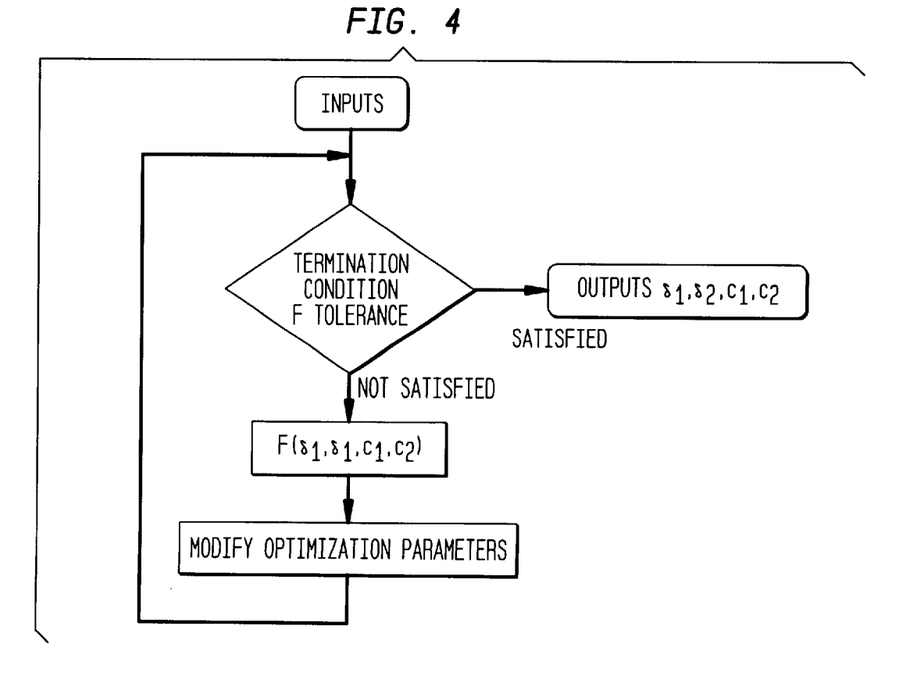
FIG. 4 is a process flowchart for implementing the optimization operation.

The flowcharts of the time and frequency domain algorithms are presented in FIGS. 3 and 4. In block 300, the input signals are supplied to the digital signal processing device. In block 302 the necessary parameters are initialized, and in block 304 calibration (preprocessing) operations are performed as explained below. In block 306, optimization search is carried out to produce optimum parameter estimation, as illustrated in detail in FIG. 4. Optimization can be performed by means of a unimodal optimization algorithm, e.g. Nelder-Mead algorithm. In block 308 the demixing operation is performed which includes delay ordering of optimization component. In block 310 postprocessing operations as explained above are carried out, and in block 312 output signals are generated.

The value of distance between microphones dictates the order of delays that can appear due to direct path propagation. For instance, the maximum delay for a sampling frequency of 16 kHz and a distance d=13 mm is approximately 0.62 samples. The maximum delay for a sampling frequency of 16 kHz and a distance d=13 cm is approximately 6.2 samples. The subsample delay generates the need for accurate delay signals at the fractional level.

Data used in parameter estimation can be obtained provided that fractional delays may be simulated. For this, two methods are used as described next.

Fractional delay by FFT domain processing. Delaying is a linear time-invariant operation. The Z-domain transfer function of a delay system x(n)->x(n−D) is:

$$H_{delay}(z) = \frac{Y(z)}{X(z)} = \frac{z^{-D} X(z)}{X(z)} = z^{-D} \quad (20)$$

The frequency response of the delaying system is obtained by replacing $z=e^{j\omega}$ where ω is the angular frequency, $\omega=2\pi f t$. A complex-valued function is obtained, with magnitude and phase given by:

$$|H_{delay}(e^{j\omega})|=1, \forall \omega$$
$$\arg\{H_{delay}(e^{j\omega})\}=-D\omega \quad (21)$$

Equation (21) can be used to design the delay system. The FFT of the delayed system shows how the Fourier representation of the non-delayed signal can be modified: each frequency component is multiplied by $H_{delay}(e^{j\omega})$, which depends on the delay value and the frequency. Fractional delay by time domain processing. An alternative implementation for a constant delay corresponds to the impulse response obtained by the inverse Fourier transform of the delay system from the frequency domain:

$$h_{delay}(n) = \frac{1}{2\pi} \int_{-\pi}^{\pi} H_{delay}(e^{j\omega}) e^{j\omega n} d\omega \qquad (22)$$

After substitution for H:

$$h_{delay}(n) = \frac{\sin[\pi(n-D)]}{\pi(n-D)} = \text{sinc}(n-D) \qquad (23)$$

For non-integer D values, sinc(n–D) is represented by an infinite series obtained by sampling sinc(x). As an approximation, only a limited number of the values can be considered as weights for convolving the to-be-delayed signal.

A fractional delay approximation can be obtained using a filter that does bandlimited interpolation between samples or uses an approximation of the sinc function above. A good solution is an allpass filter, called the Thiran filter, which is based on minimization of the phase least square error. The z transfer function of an all pass filter of order N is of the form:

$$A(z) = \frac{z^{-N} D(z^{-1})}{D(z)} = \frac{a_N + a_{N-1} z^{-1} + \ldots + a_{-1} z^{-(N-1)} + z^{-N}}{1 + a_1 z^{-1} + \ldots + a_{N-1} z^{-(N-1)} + a_N z^{-N}} \qquad (24)$$

The all pass filter coefficients are given by the formulas:

$$a_k = (-1)^k \binom{N}{k} \cdot \prod_{n=0}^{N} \frac{D-N+n}{D-N+k+n}, \quad k = 0, 1, 2, \ldots, N \qquad (25)$$

The advantages of this approximation, considered the best choice for many practical application are:

Coefficients are in closed form, and can be tabulated

For large enough N, the resulting filters are guaranteed to be stable

Method is suitable for applications requiring real-time coefficients update

In these implementations, N=11 have been used, which results in a Thiran filter with a very good phase delay approximation. The filter is extremely efficient and accurate. Further in these implementations, the time domain fractional delay filter have been used, which is much more efficient than the frequency domain filter.

Preprocessing. It is expensive and impractical to pair together microphones with identical response characteristics. Alternatively, data can be preprocessed as if it were recorded on nearly identical microphones. This can be easily achieved under the far field model. A distant source results in nearly equal power levels at two identical microphones, and the same is true about the mixtures. The equality on power on the two input channels is the constraint imposed by the preprocessing algorithm.

In the present case, the contribution of the individual sources on each input channel is known. Therefore, the power equality constraint ensures that each source on each channel has a power equal to, for instance, the power of source 1 on channel 1:

$$x_2^{Ch1} \leftarrow x_2^{Ch1} \cdot \frac{std(x_1^{Ch1})}{std(x_2^{Ch1})} \qquad (26)$$

$$x_1^{Ch2} \leftarrow x_1^{Ch2} \cdot \frac{std(x_1^{Ch1})}{std(x_1^{Ch2})}$$

$$x_2^{Ch2} \leftarrow x_2^{Ch2} \cdot \frac{std(x_1^{Ch1})}{std(x_2^{Ch2})}$$

Time domain implementation. A robust implementation of criterion (15) from previous section averages crosscorrelations over a number of windows $k_{avg}$, of size w. more precisely f is defined as follows:

$$F(D_1, D_2, c_1, c_2) = \sum_{k=1}^{K_{avg}} \|[x_1^{w*k+1:w*k+w}(t-D_1) - c_1 x_2(t)]' \cdot \qquad (27)$$

$$[c_2 x_1^{w*k+1:w*k+w}(t-D_2) - x_2(t)]\|$$

The resulting algorithm for determining parameters is called McT (Minimization of Crosscorrelations in Time domain). Its pseudocode description is provided next.

Algorithm McT
    Initialize D1, D2, c1, c2
    While not(optimization-stopping-criterion) do
        X1=fractional delay (x1,D1)–x2
        X2=fractional delay (x1,D2)–x2
        Compute McT criterion F(D1,D2)
        Modify D1,D2 in optimization neighborhood
    Return D1,D2, c1, c2.

Figure 5:
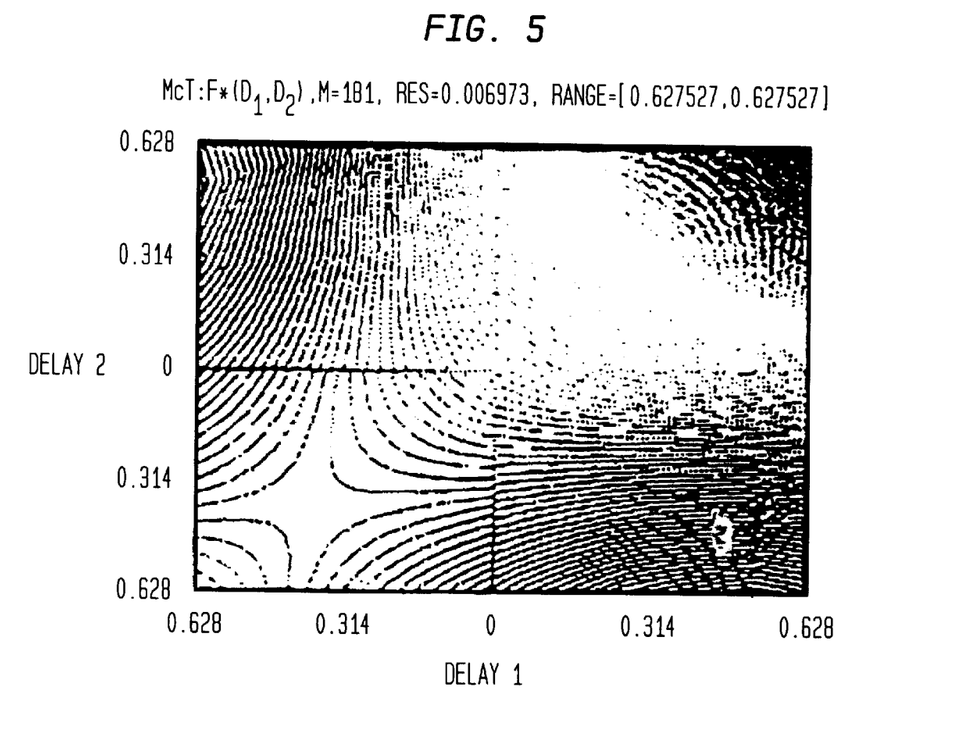
FIG. 5 is a diagram illustrating the search surface generated by McT criterion from equation (25)

This approach yields the search surface illustrated in FIG. 5.

Figure 6:
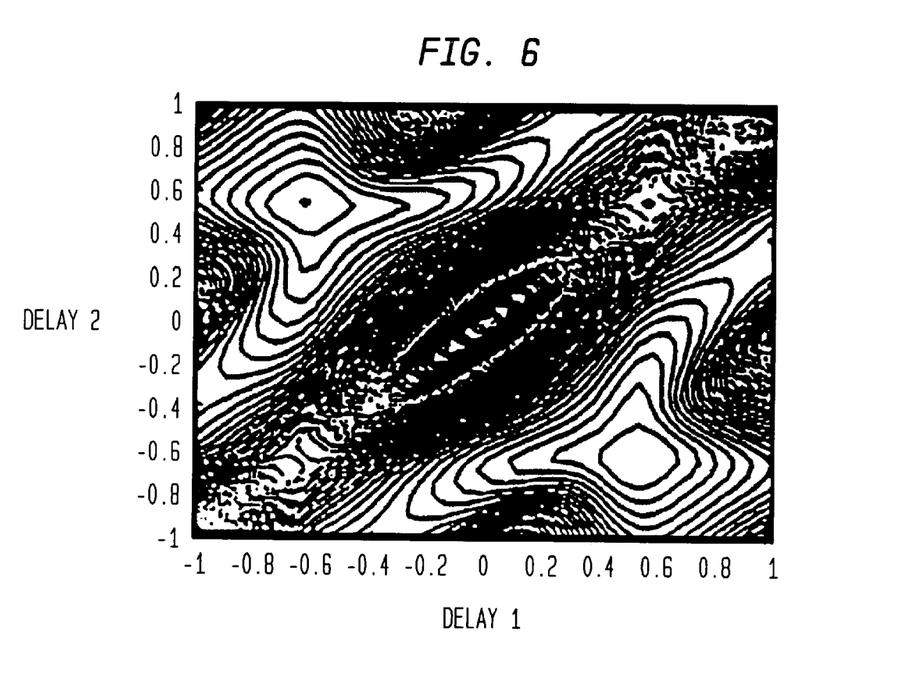
FIG. 6 is a diagram illustrating the search surface generated by McF criterion from equation (26).

Frequency domain implementation. In addition to the pair of equations for each frequency (see Equation (18)), a Fourier Transform for all blocks of data can be computed to obtain a full set of equations for each block. This approach assumes that each data block is statistically stationary. The problem is easily posed as an optimization problem by considering each equation of the form F(x)=0, with F given by:

$$\sum_{\omega \atop datablock} \sum \left| \frac{\frac{a}{b} R_{11}^X(\omega) + \frac{b}{a} R_{22}^X(\omega) - ab R_{21}^X(\omega) - \frac{1}{ab} R_{12}^X(\omega)}{|\det A|^2 + \kappa} \right| \qquad (28)$$

where κ is a constant (0.1 to 1) that helps prevent singularities. This yields the search surface illustrated in FIG. 6.

The computation of the McF (Minimum Cross Correlation Constraint in the Frequency Domain) cost function is carried out according to the following steps:

Given two mixtures $x_1$ and $x_2$, delays $d_1$, $d_2$, scalars $c_1$, $c_2$:
    Choose block size N=128; sum=0
    For each block in $x_1, x_2$
        $X_1$=window($x_1$),$x_2$=window($x_2$)
        $X_1$=FFT($x_1$),$X_2$=FFT($x_2$)
        $R^X{}_{11}=X_1.X_1{}^*$, $R^X{}_{12}=X_1.X_2{}^*$, $R^X{}_{21}=X_2.X_1{}^*$, $R^X{}_{22}=X_2.X_2{}^*$ . . .
        a=exp(–$jwd_1$), b=exp(–$jwd_2$)
        sum=sum+McF($R^X{}_{11}$, $R^X{}_{12}$, $R^X{}_{21}$,$R^X{}_{22}$, a,b)
    end The McF cost function for one block is a weighted summation of the cross correlations at each frequency. The McF cost function for a data set is the sum of the McF cost functions for each block in the data set. The number 128 was chosen because it is a power of two, is small enough for the data within the block to be considered stationary but large enough to get usable estimates for the correlation functions. The optimization of the McF cost function follows the same steps as for McT.

Postprocessing. Let it be assumed that two echoic time delay mixtures are expressed in the following form:

$$\hat{s}_1(t) = x_1(t+\tau_2) - c_1 x_2(t-\tau_2)$$

$$\hat{s}_2(t) = c_2 x_1(t+\tau_1) - x_2(t-\tau_1)$$

Computing the separated sources by time differences as above leads to the separated outputs having poor audio quality with both separated sources sounding rather "tinny". The reason for this is apparent if one studies the theoretical demixing matrix in the frequency domain:

$$\begin{bmatrix} \hat{s}_1(w) \\ \hat{s}_2(w) \end{bmatrix} = \frac{1}{\det A(\omega)} \begin{bmatrix} e^{jw\delta_2} & -c_1 e^{-jw\delta_2} \\ -c_2 e^{jw\delta_1} & e^{-jw\delta_1} \end{bmatrix} \cdot \begin{bmatrix} x_1(w) \\ x_2(w) \end{bmatrix}$$

In order to implement the theoretical demixing procedure one has to divide by the determinant of the mixing matrix. Obviously one could filter using the inverse of the determinant to obtain optimal results. Unfortunately, optimal inverse filtering using the determinant is not simply a matter of dividing by the determinant in the frequency domain. The problem is dividing by zero or very small numbers. Under such conditions even the presence of a very small amount of noise (e.g. caused by quantization in floating point representation) can be disastrous. A better approach is to use a Wiener Filter.

$$H(f) = \left( \frac{S}{S+\eta} \right) \frac{1}{\det A}$$

The Wiener filter requires knowledge both of the signal and noise power spectral densities, S and η, respectively. This information is not available to us but a reasonable approximation is to assume that the (wideband) sources have a flat spectral density and the noise corrupting the mixtures is white. In this case, the Wiener Filter becomes:

$$H(f) = \left( \frac{|\det A|^2}{|\det A|^2 + \eta} \right) \frac{1}{\det A}$$

The noise power spectral density η has been found experimentally to lie between 0.1 and 1 for typical block size of 128 and mixtures scaled to lie between −1 and 1. Applying this choice of filter usually dramatically improves the quality of the separated outputs. Voices sound more natural and there is no trace of the tinniness that affected the results obtained without a determinant filter. The Wiener filter would be even more effective given better estimates for the signal and power spectral densities.

The technique of postprocessing using the determinant of the mixing matrix is perfectly general and applies equally well to demixtures computed using matrices of FIR filters. The quality of the result depends primarily on the care with which the inverse filter is implemented. It also depends on the accuracy of the estimate for the mixing parameters. Unpleasant artifacts can be introduced by the postprocessing stage if bad parameter estimates are used. Fortunately, this is easily spotted for delay mixtures because the distance between the microphones and the finite speed of sound limits the range of time delays. In addition, one should avoid using the Wiener filter for near-degenerate mixtures.

The optimization procedure can be implemented using a number of algorithms that would perform well for unimodal surfaces, such as Simplex, Conjugate Gradients or BFGS. There appears to be no need for complicated search strategies such as simulated annealing or genetic algorithms because the cost function is not multimodal (once one confines the search to the space of microphone delays that are physically possible).

Described hereinabove in detail is the design of two second-order algorithms for Blind Source Separation. The algorithms were derived from first principles using second order statistics and the assumptions of orthogonality of sources and of weak source stationarity. The above approach is based on minimization of cross-correlations of the estimated sources, in the time or frequency domains. The great advantage of this approach it that it reduces source separation to a decorrelation problem, which is theoretically solved by a system of equations. This provided considerable insight into the operation of the algorithms to develop strategies for more complex algorithms.

The techniques described hereinabove proved successful in the following situations:

separation of two voices for anechoic real-world voice mixtures, even where the sources have very similar spectral power characteristics;

separation of one voice for echoic real-world voice mixtures;

separation across a wide range of input SNR levels;

separation of a voice even in degenerate mixing situations of three voices;

separation of a voice from echoic real-world noise-voice mixtures.

Moreover, outputs were free from artifacts and were obtained with low computational requirements.

Although the delay model generates essentially anechoic time delay algorithms, the results of this work show systematic improvement in speech intelligibility even when the algorithms are applied to echoic data.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing a blind source separation, comprising the steps of:

inputting a mixture of at least two source signals;

attenuating the at least two source signals of said mixture;

performing a number of fractionally delayed measurements of said mixture;

cross-correlating differences of the attenuated and fractionally delayed measurements of said mixture comprised of said two source signals; and minimizing the cross-correlated differences to obtain parameter estimates for demixed sources.

2. The method according to claim 1, wherein said steps of inputting, performing, cross-correlating and minimizing are selectively performed in one of time domain and frequency domain.

3. The method according to claim 1, further comprising imposing a cross-correlation constraint between the output estimates as a function of delay and attenuation compensation parameters.

4. The method according to claim 1, further comprising providing at least two microphones for inputting said mixture of source signals such that a distance between said two microphones is substantially less than a distance from the two sources for producing said mixture of source signals to each of said two microphones.

5. The method according to claim 4, wherein said two sources are not symmetric with respect to a microphone axis in determining positive and negative angles of arrival from the sources.

6. The method according to claim 5, wherein said two sources produce source signals that are orthogonal and of weak source stationarity.

7. The method according to claim 1, further comprising selecting the demixed sources for presenting on channels in a predetermined order.

8. The method according to claim 7, wherein the demixed sources are selected on the basis of a relationship between phase delays and angles of arrivals of the sources.

9. The method according to claim 8, wherein a source that is the closest to a microphone axis is presented on a first channel.

10. The method according to claim 9, wherein the source that is the closest to said microphone axis is determined by calculating the minimum delay parameter.

11. The method according to claim 1, further comprising pre-processing the input source signals to equalize power on each channel prior to processing operations.

12. A digital signal processing device for carrying out a blind source separation, comprising:
a signal acquisition device for inputting a mixture of at least two source signals; and
a programmable processor for attenuating the at least two source signals of said mixture and performing a number of fractionally delayed measurements of said mixture, said programmable processor being operative to cross-correlate differences of the attenuated and fractionally delayed measurements of said mixture comprised of said two source signals and being further operative to minimize the cross-correlated differences to obtain parameter estimates for demixed sources.

13. The digital signal processing device according to claim 12, which is located in a hearing device that includes at least two microphones spaced apart at a predetermined distance.

14. The digital signal processing device according to claim 12, wherein said signal acquisition device and programmable processor selectively operate in one of time domain and frequency domain.

15. The digital signal processing device according to claim 12, wherein said programmable processor is further operative to select the demixed sources for presenting on channels in a predetermined order.

16. The digital signal processing device according to claim 15, wherein said programmable processor selects the demixed sources on the basis of a relationship between phase delays and angles of arrivals of the source signals.

17. The digital signal processing device according to claim 16, wherein said programmable processor provides a source that is the closest to a microphone axis on a first channel by calculating the minimum delay parameter.

18. The digital signal processing device according to claim 16, wherein said programmable processor selects the most frontal direction of the source as a desired signal.

19. The digital signal processing device according to claim 16, wherein said programmable processor selects an output signal with the highest level as a desired signal.

20. The digital signal processing device according to claim 16, wherein said programmable processor selects an output signal with the highest signal-to-noise ratio as a desired signal.

21. The method of claim 1, wherein said blind source separation is performed in a hearing aid device.

22. The method of claim 4, wherein said at least two microphones are provided in a hearing aid device.

23. The digital signal processing device of claim 16, wherein said programmable processor is located in a hearing aid device.

24. A method for performing a blind source separation, comprising the steps of:
inputting a mixture of at least two source signals;
performing a number of fractionally delayed measurements of said mixture;
cross-correlating differences of the fractionally delayed measurements of said mixture comprised of said two source signals; and
minimizing the cross-correlated differences to obtain parameter estimates for demixed sources; and
selecting the demixed sources for presenting on channels in a predetermined order, wherein the demixed sources are selected on the basis of a relationship between phase delays and angles of arrivals of the sources.

* * * * *